United States Patent
Hildebrand et al.

(10) Patent No.: US 8,838,902 B2
(45) Date of Patent: Sep. 16, 2014

(54) CACHE LAYER OPTIMIZATIONS FOR VIRTUALIZED ENVIRONMENTS

(71) Applicant: International Business Machines Corporation, Armonk, NY (US)

(72) Inventors: Dean Hildebrand, Sumas, WA (US); Anna S. Povzner, San Jose, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/652,195

(22) Filed: Oct. 15, 2012

(65) Prior Publication Data

US 2014/0108732 A1   Apr. 17, 2014

(51) Int. Cl.
*G06F 12/08* (2006.01)

(52) U.S. Cl.
CPC .... *G06F 12/0842* (2013.01); *G06F 2212/6046* (2013.01)
USPC .................................. 711/130; 711/6; 718/1

(58) Field of Classification Search
USPC .......................................... 711/6, 130; 718/1
See application file for complete search history.

(56) References Cited

U.S. PATENT DOCUMENTS

| | | | |
|---|---|---|---|
| 7,424,577 B2 | 9/2008 | Bali et al. | |
| 7,430,639 B1 | 9/2008 | Bali et al. | |
| 7,581,064 B1 | 8/2009 | Zedlewski et al. | |
| 2008/0022048 A1* | 1/2008 | Baker | 711/130 |
| 2008/0126547 A1* | 5/2008 | Waldspurger | 709/226 |
| 2008/0294846 A1 | 11/2008 | Bali et al. | |
| 2010/0191909 A1 | 7/2010 | Archer et al. | |
| 2012/0210068 A1* | 8/2012 | Joshi et al. | 711/122 |
| 2013/0318301 A1* | 11/2013 | Chen et al. | 711/119 |

OTHER PUBLICATIONS

Anonymous, Methods for Coarse-Grained Cache Utility Profiling in Clock Using Valueless Keys, ip.com, Jul. 14, 2011.
Anonymous, Self-Synchronizing Distributed Cache for Reducing Redundant Data Transfer in Distributed Shared Nothing Environments, ip.com, May 24, 2011.
Anonymous, Method for Render-Cache Optimization for Zone Rendering, ip.com, Sep. 11, 2002.

* cited by examiner

*Primary Examiner* — Jared Rutz
(74) *Attorney, Agent, or Firm* — Lieberman & Brandsdorfer, LLC

(57) ABSTRACT

Embodiments of the invention relate to optimizing the storage of data in a multi-cache level environment. In one aspect, data is classified into primary and secondary cache sections. Data is differentiated based on an inherent sharing characteristic of the data within a system comprising virtual machines. The data is then placed into the classified sections of the cache storage layer and/or persistent data, reflective of how the data is shared among virtual disk images access by virtual machines.

18 Claims, 8 Drawing Sheets

CACHE LAYER OPTIMIZATIONS FOR VIRTUALIZED ENVIRONMENTS

BACKGROUND

The present invention relates to cache data storage. More specifically, the invention relates to a method, system, and computer program product for optimization of cache data storage across a system of virtual machines.

With the rapid development of server workload virtualization, there exists a demand for effective caching in storage systems. Caching can reduce the latency of systems as well as increase the input and output operations per second. Caching is considered to be effective when items placed in the cache have a greater likelihood of access than data placed in persistent storage. Virtual machines cache data in their own operating system caching layer. This cached data is often stored both in the virtual machine as well as in a remote storage system. As a result, cached data, especially data cached on read requests, is almost always accessed from the cache of the virtual machine and is likely never accessed from the storage system cache.

While the virtualization of data centers offers increased support for applications, these data centers are restricted by a limited quantity of server memory. Specifically, as the number of virtual machines in a system increases, there is an increased pressure placed on shared storage arrays. In larger systems, while the individual memory of a virtual machine is typically smaller than the memory of a storage system, the total memory of all virtual machines in the system is greater than the memory of the storage system.

Virtual machines are unique in that each virtual machine accesses its own disk image data, and while a virtual machine may access common data blocks in the server storage system via de-duplication and cloning, it does not share its data across other virtual machines. Consequently, the storage system cache can end up thrashing; caching and evicting data before it is even accessed a second time. This thrashing is wasteful and possibly detrimental by evicting shared data to make room for unshared and unaccessed data.

BRIEF SUMMARY

This invention comprises a method, system, and article for optimization of a cache storage layer of a data storage system.

In one aspect, a method is provided for optimizing a cache storage layer of a storage system. More specifically, a method is provided for classifying the cache storage layer into at least two sections, including a primary cache section and a secondary cache section. Blocks of data are differentiated based on an inherent sharing characteristic of the data block. The optimized cache storage layer is utilized responsive to the inherent characteristic of the data block. More specifically, one or more data blocks are selectively placed into one of the classified sections of the cache storage layer based on the characteristics of the data block(s). The placement of the data blocks reflects sharing of the data blocks among virtual disk images access by virtual machines.

In another aspect, a system is provided having a storage system with an optimized cache storage layer. The storage system includes a cache layer and persistent storage. The cache layer is separated into two sections, including a primary cache section and a secondary cache section. A functional unit is provided in communication with one or more tools to optimize read and write transactions with the cache layer. The tools include, but are not limited to, an identification manager and a placement manager. The identification manager differentiates blocks of data based on an inherent sharing characteristic of the data block. The placement manager places one or more data blocks into one of the classified sections of the cache layer based on the differentiation placed on the blocks by the identification manager. More specifically, the placement of the data blocks into one of the classified sections of the cache layer reflects a sharing characteristic of the data blocks.

In yet another aspect, a computer program product is provided for optimization of a cache layer. The computer program product comprises a computer readable storage medium having program code embodied thereon. The program code is executable by a processor to optimize a cache storage layer in a storage system, and to store blocks of data responsive to the optimization. More specifically, the program code classifies the cache layer into a primary cache section and a secondary cache section. The program code differentiates blocks of data based on an inherent sharing characteristic of the data block. The program code utilizes the optimized cache storage layer responsive to the inherent characteristic of the data block. More specifically, the program code places one or more data blocks into one of the classified sections of the cache storage layer with the placement of the data blocks reflecting sharing of the data blocks among virtual disk images accessed by virtual machines.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
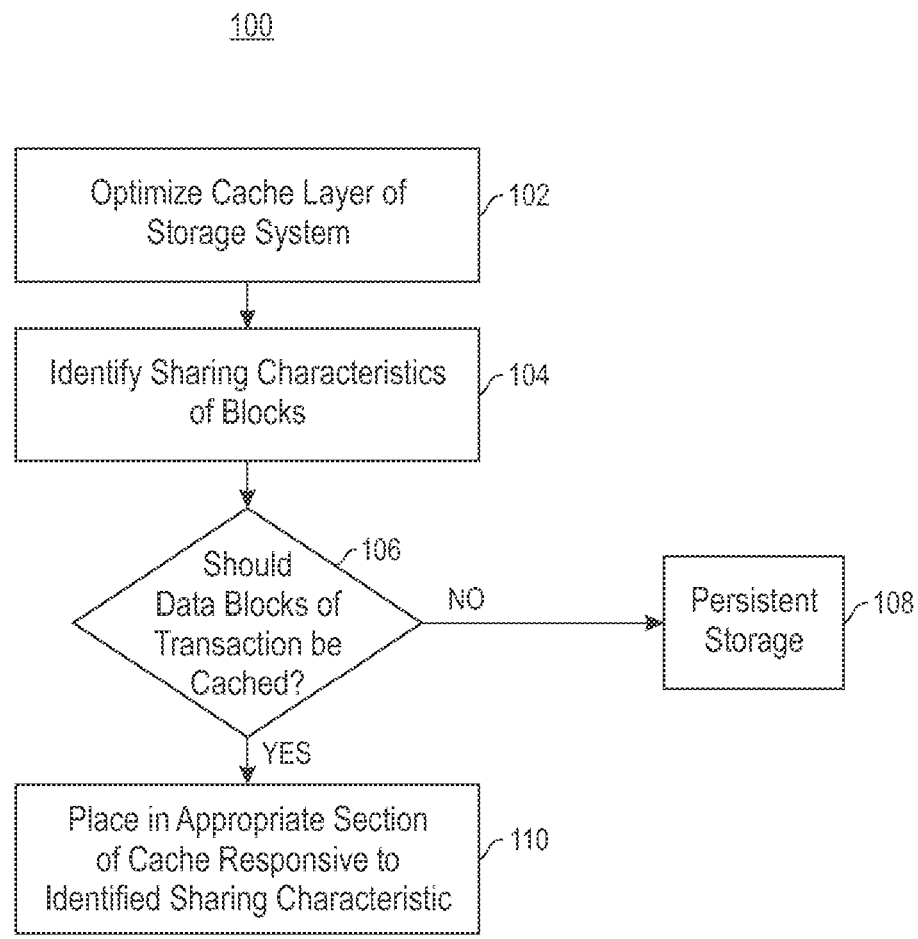
FIG. 1 is a flow chart illustrating a method for the placement of data into storage, including persistent and volatile storage sections.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit(s) described in this specification has been labeled with tools in the form of manager(s). A manager may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers and directors.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A virtual machine is a software and/or hardware implementation of a computer that executes programs similar to a physical machine. The virtual machine supports an instance of an operating system along with one or more applications to run in an isolated partition within the computer. In one embodiment, the virtual machine enables different operating systems to run in the same computer simultaneously. One physical machine may support multiple virtual machines. Multiple operating systems can run in the same physical machine, and each of the virtual machines may process jobs with different operating systems. Accordingly, the use of one or more virtual machines associated with a single physical machine supports efficient use of hardware while processing multiple jobs.

Efficient use of a virtual machine configuration in a shared group of resources, also referred to herein as a cloud computing system is challenging due to the distributed nature of the physical topology of the physical machines, i.e. nodes. More specifically, the concerns pertain to a assessing and exposing the shared characteristics of data storage blocks.

FIG. 1 is a flow chart illustrating a method for assigning data to a designated storage location in a shared pool of resources, also referred to herein as a cloud layer. The storage location includes at least two categories of data storage, including persistent storage and volatile storage. The volatile storage is shown herein as a cache layer, which is optimized (102). Specifically, the cache layer is separated into at least two sections, including a primary cache section and a secondary cache section. The cache layer is a standard cache consisting of a single type of storage medium, such as RAM, split into two parts, e.g. primary section and secondary section. Specifically, the cache layer is a flat cache wherein the two sections are represented on the same tier in a hierarchical arrangement. In one embodiment, the primary section may be referred to herein as long term cache in that the data may reside in this portion of the cache for an extended period of time in comparison to data residing in the secondary section, and the secondary section may be referred to herein as short term cache in that the data may reside in this portion of the cache for a relatively short period of time in comparison to data residing in the primary section. Accordingly, the primary and secondary sections of the cache layer are optimized into at least two sections, each section equally placed within the hierarchy of data storage, but reflecting characteristics of the data residing therein.

Blocks of data associated with a read or write transaction are differentiated based on identifying an inherent sharing characteristics of the data blocks (104). In one embodiment, the blocks of data are differentiated based on whether or not the data is being accessed from more than one virtual machine in communication with the storage location. From the identified sharing characteristic, it is determined whether the blocks of data should be placed in one of the cache layers (106). In one embodiment, the determination at step (106) may be inverted, such that the determination is based upon whether the blocks of data should be placed in persistent storage. If at step (106) the data blocks are determined not to be cached, the data blocks are placed in persistent storage (108). Similarly, if at step (106) it is determined that the data blocks are to be cached, the data blocks are placed in an appropriate section of the cache layer (110). In one embodiment, the section of the cache a data block is placed is determined by the inherent sharing characteristic of the data block. Accordingly, data is allocated an appropriate location in data storage dependent on characteristics of the data.

Figure 2:
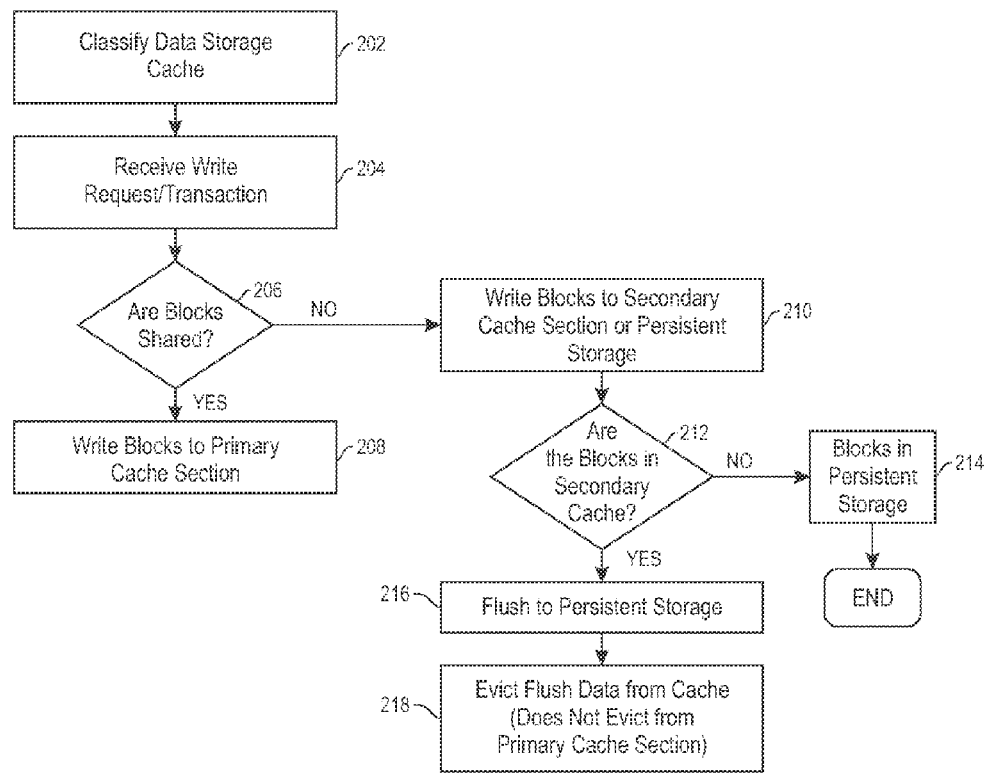
FIG. 2 is a flow chart illustrating a method for classifying data in storage responsive to a write transaction.

FIG. 1, as described above, is a general description of a read transaction and storage of data blocks associated with the transaction. FIG. 2 is a flow chart (200) illustrating a method for allocating data responsive to a write transaction. Storage space in the cache layer is classified into at least two sections, including a primary cache section and a secondary cache section (202). In response to receipt of a write transaction (204), an inherent sharing characteristic of one or more data blocks targeted in the write transaction is identified. Specifically, it is determined whether the data block(s) associated with the write transaction is shared or unshared among virtual machines (206). In one embodiment, a data block is considered shared if it is accessible by more than one virtual machine in a system of virtual machines. Data blocks determined to be shared are written to the primary cache section (208), and data blocks determined not to be shared are written to the secondary cache section or to persistent storage (210). Accordingly, the first aspect of writing data to a storage location assesses the characteristics of the data blocks associated with the write transaction.

As shown at step (210), the data blocks associated with the write transaction may be placed in the secondary layer of the storage system cache, or they may be placed in persistent storage. The secondary layer of the storage system cache is a form of volatile storage. Following step (210), it is determined whether the data blocks were placed in the secondary cache (212). If the data blocks are not in the secondary cache layer, then blocks of data reside in the persistent storage (214). Conversely, if the data blocks are in the secondary cache layer, the data is flushed to persistent storage (216), wherein the data blocks are evicted from the secondary cache layer (218). In one embodiment, flushing of data from the cache layer to persistent storage is limited to data placed in the secondary cache layer. Accordingly, data is written to persistent storage or one of the primary or secondary cache layers responsive to a write transaction.

Figure 3:
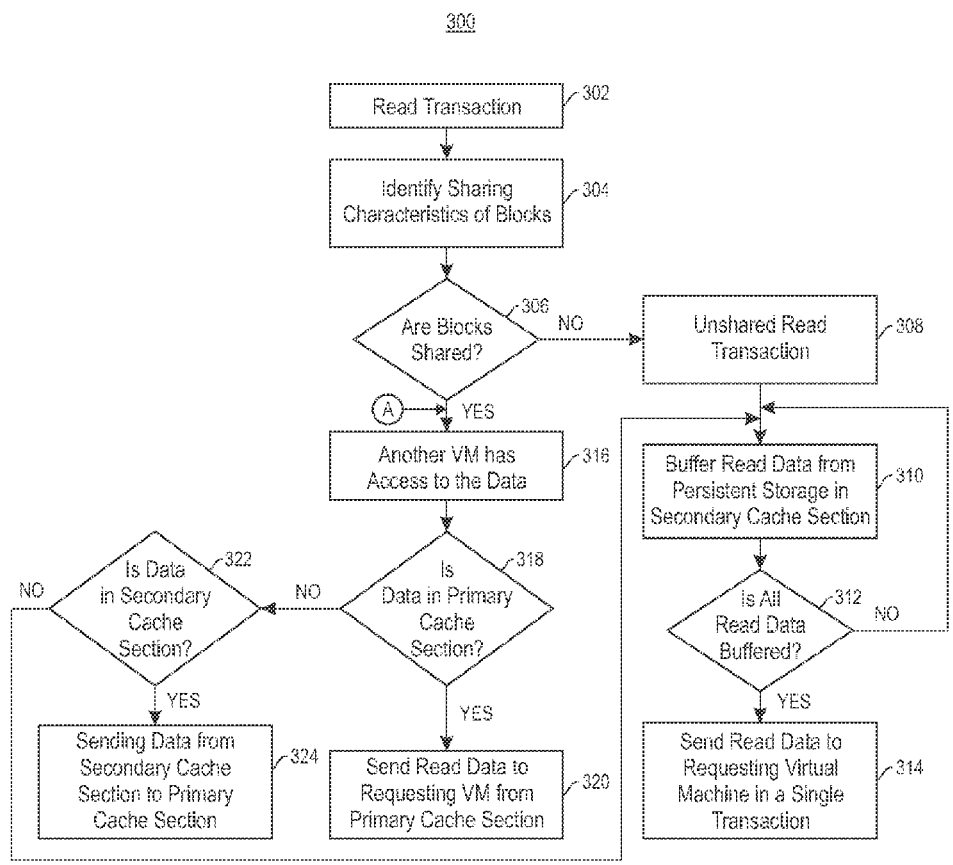
FIG. 3 is a flow chart illustrating a method for accessing read data responsive to a read transaction.

FIG. 3 is a flow chart illustrating a method for accessing data in the storage system responsive to a read transaction. A read transaction is executed (302) and sharing characteristics of the data block(s) are identified (304). The sharing characteristics reflect the location of the data block(s) to support the read transaction. Following step (304), it is determined whether the data block(s) associated with the read transaction is shared or unshared among virtual machines (306). In one embodiment, a data block is considered shared if it is accessible by more than one virtual machine in a system of virtual machines. Similarly, in one embodiment, the reference count is employed to identify sharing characteristics as it is representative of how many virtual machines in the system have access to any of the data blocks associated with the subject read transaction. An example of where a reference count can be increased in a storage system is due to file cloning or data block de-duplication. A positive response to the determination at step (306) is an indication that the data block(s) associated with the read transaction has been accessed more than once, e.g. by at least one other virtual machine. Similarly, a negative response to the determination at step (306) is associated with unshared data (308). Accordingly, the first part of the read transaction process includes identifying a share characteristic of the underlying data.

For a read transaction associated with unshared data, the data is considered to be in persistent storage. Read transaction data is buffered from persistent storage to the secondary cache section (310). Following step (310), it is determined if all the read data for the transaction was buffered (312). A negative response is followed by a return to step (310) for continued buffering of the read data, and a positive response is followed by the read transaction data sent to the requesting virtual machine in a single transaction from the cache layer of the storage system (314).

For a read transaction associated with shared data, e.g. the reference count is determined to be greater than one, the data is considered to be in either the primary or secondary section of the cache. The shared data characteristic is also indicative that more than one virtual machine has access to the data block(s) associated with the read transaction data (316). Since the cache layer has a primary section and a secondary section, it is determined whether the data block(s) associated with the read transaction is in the primary cache section of cache storage (318). In one embodiment, the determination at step (318) may be reversed to assess the location of the subject data block(s). If at step (318), it is determined that the data block(s) to support the read transaction is in the primary cache section, then the data is sent to the requesting virtual machine from the primary cache section (320). Otherwise, the data block(s) are determined to be in either the secondary cache section or persistent storage. A negative response to the determination at step (318) is followed by an assessment of whether the data block(s) to support the read transaction are in the secondary cache section (322). A positive response to the assessment at step (322) is following by sending the data from the secondary cache section to the primary cache section (324), and then a return to step (320) to support completion of the transaction from the cache layer to the requesting machine. A negative response to the determination at step (322) is followed by a return to step (310). Accordingly, each read transaction is assessed to ascertain a location of the supporting data block(s), with communication of the data blocks to the requesting machine communicated from either the primary or secondary sections of the cache layer.

Figure 4:
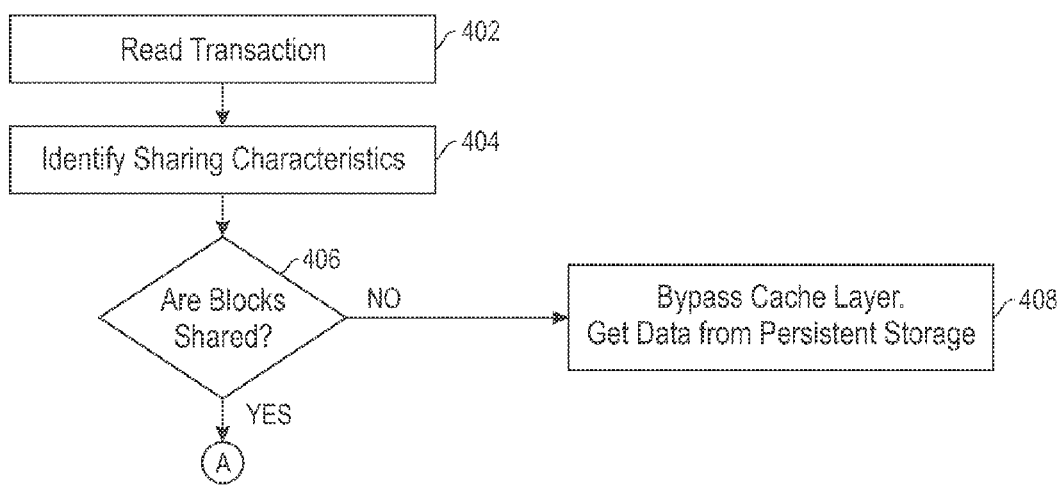
FIG. 4 is a flow chart illustrating a method for accessing data responsive to a read transaction.

FIG. 4 is a flow chart (400) illustrating one embodiment for accessing data in response to a read transaction. As noted above, data blocks in the storage system are assessed to determine whether they are shared by more than one virtual machine, or if they have been access to support more than one read transaction. A read transaction is executed (402) and sharing characteristics of the data block(s) are identified (404). The sharing characteristics reflect the location of the data block(s) to support the read transaction. In one embodiment, a reference count is employed to identify sharing characteristics. The reference count is representative of how many virtual machines in the system have access to any of the data blocks associated with the subject read transaction. An example of where a reference count can be increased in a storage system is due to file cloning or data block de-duplication. Following identification of the sharing characteristics of the data block(s) at step (404), it is determined whether the data block(s) associated with the read transaction is shared or unshared among virtual machines (406). For example, in one embodiment, a reference count less than two is an indication that the data block(s) associated with the read transaction are not shared among more than one virtual machine, or have only been used to support a single transaction by a single machine. A determination at step (406) that the data block(s) are shared is followed by a return to step (316). However, a determination at step (406) that the data block(s) are not shared is an indication that the supporting data block(s) are in persistent storage. The cache layer is bypassed, and the data block(s) to support the read transaction is accessed from persistent storage (410). Accordingly, a read transaction of unshared data enables a bypass of the cache layer to support the read transaction.

Figure 5:
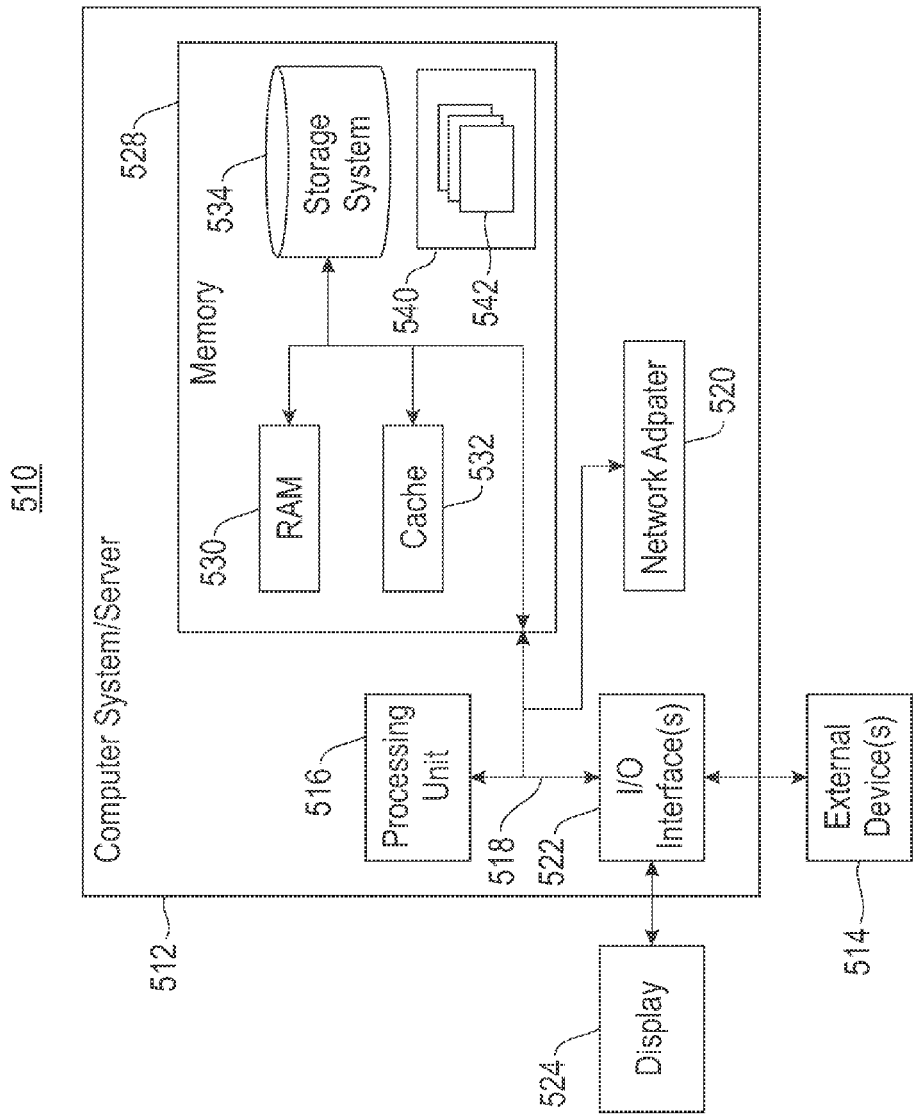
FIG. 5 depicts a cloud computing node according to an embodiment of the present invention.

As discussed herein, two or more virtual machines are provided in communication with a storage system to support read and write transactions. The storage system includes persistent and volatile storage. In one embodiment, the storage system is configured in a cloud computing environment service oriented with a focus on statelessness, low coupling, modularity, and semantic interoperability. At the heart of cloud computing is an infrastructure comprising a network of interconnected nodes. Referring now to FIG. 5, a schematic of an example of a cloud computing node is shown. Cloud computing node (510) is only one example of a suitable cloud computing node and is not intended to suggest any limitation as to the scope of use or functionality of embodiments of the invention described herein. Regardless, cloud computing node (510) is capable of being implemented and/or performing any of the functionality set forth hereinabove. In cloud computing node (510) there is a computer system/server (512), which is operational with numerous other general purpose or special purpose computing system environments or configurations. Examples of well-known computing systems, environments, and/or configurations that may be suitable for use with computer system/server (512) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (512) may be described in the general context of computer system-executable instructions, such as program modules, being executed by a computer system. Generally, program modules may include routines, programs, objects, components, logic, data structures, and so on that perform particular jobs or implement particular abstract data types. Computer system/server (512) may be practiced in distributed cloud computing environments where jobs are performed by remote processing devices that are linked through a communications network. In a distributed cloud computing environment, program modules may be located in both local and remote computer system storage media including memory storage devices.

As shown in FIG. 5, computer system/server (512) in cloud computing node (510) is shown in the form of a general-purpose computing device. The components of computer system/server (512) may include, but are not limited to, one or more processors or processing units (516), a system memory (528), and a bus (518) that couples various system components including system memory (528) to processing unit (516). Bus (518) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (512) typically includes a variety of computer system readable media. Such media may be any available media that is accessible by computer system/server (512), and it includes both volatile and non-volatile media, removable and non-removable media.

System memory (528) can include computer system readable media in the form of volatile memory, such as random access memory (RAM) (530) and/or cache memory (532). Computer system/server (512) may further include other removable/non-removable, volatile/non-volatile computer system storage media. By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (518) by one or more data media interfaces. As will be further depicted and described below, memory (528) may include at least one program product having a set (e.g., at least one) of program modules that are configured to carry out the functions of embodiments of the invention.

Program/utility (540), having a set (at least one) of program modules (542), may be stored in memory (528) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the invention as described herein.

Computer system/server (512) may also communicate with one or more external devices (514), such as a keyboard, a pointing device, a display (524), etc.; one or more devices that enable a user to interact with computer system/server (512); and/or any devices (e.g., network card, modem, etc.) that enable computer system/server (512) to communicate with one or more other computing devices. Such communication can occur via Input/Output (I/O) interfaces (522). Still yet, computer system/server (512) can communicate with one or more networks such as a local area network (LAN), a general wide area network (WAN), and/or a public network (e.g., the Internet) via network adapter (520). As depicted, network adapter (520) communicates with the other components of computer system/server (512) via bus (518). It should be understood that although not shown, other hardware and/or software components could be used in conjunction with computer system/server (512). Examples, include, but are not limited to: microcode, device drivers, redundant processing units, external disk drive arrays, RAID systems, tape drives, and data archival storage systems, etc.

Figure 6:
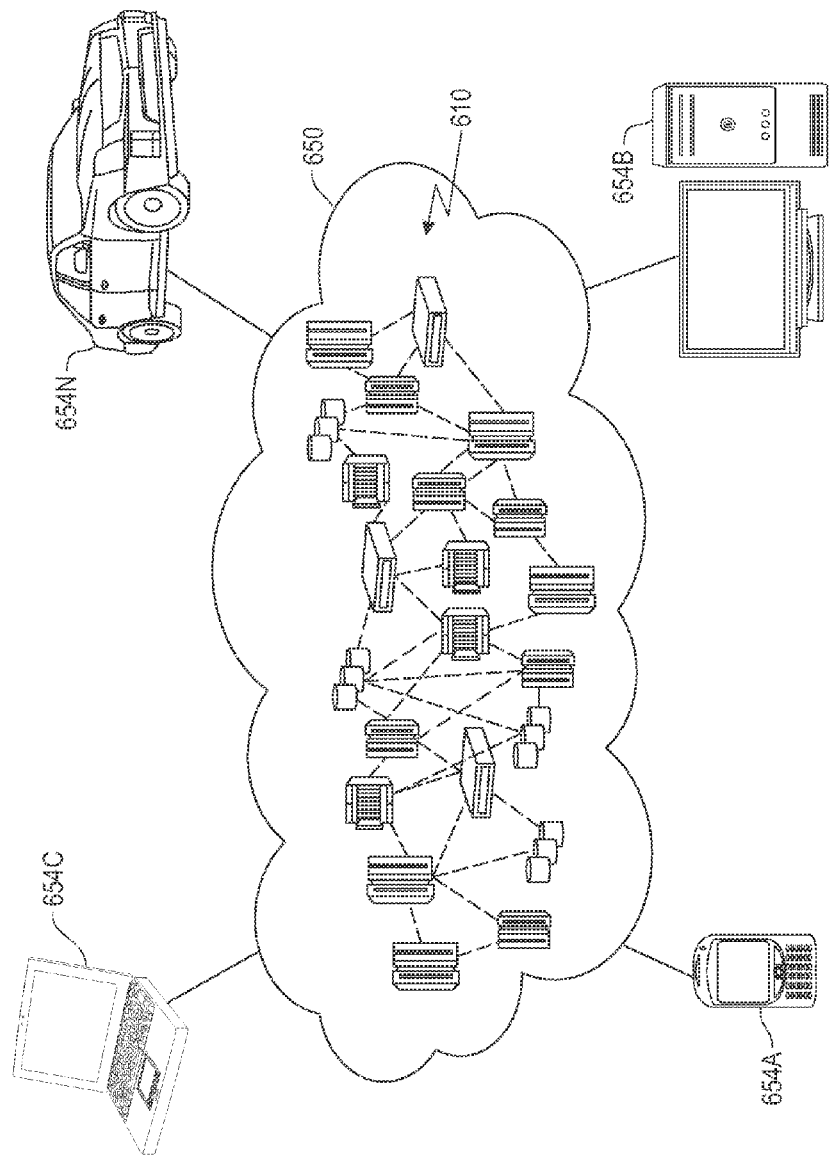
FIG. 6 depicts a cloud computing environment according to an embodiment of the present invention.

Referring now to FIG. 6, illustrative cloud computing environment (650) is depicted. As shown, cloud computing environment (650) comprises one or more cloud computing nodes (610) with which local computing devices used by cloud consumers, such as, for example, personal digital assistant (PDA) or cellular telephone (654A), desktop computer (654B), laptop computer (654C), and/or automobile computer system (654N) may communicate. Nodes (610) may communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (654A)-(654N) shown in FIG. 2 are intended to be illustrative only and that computing nodes (610) and cloud computing environment (650) can communicate with any type of computerized device over any type of network and/or network addressable connection (e.g., using a web browser).

Figure 7:
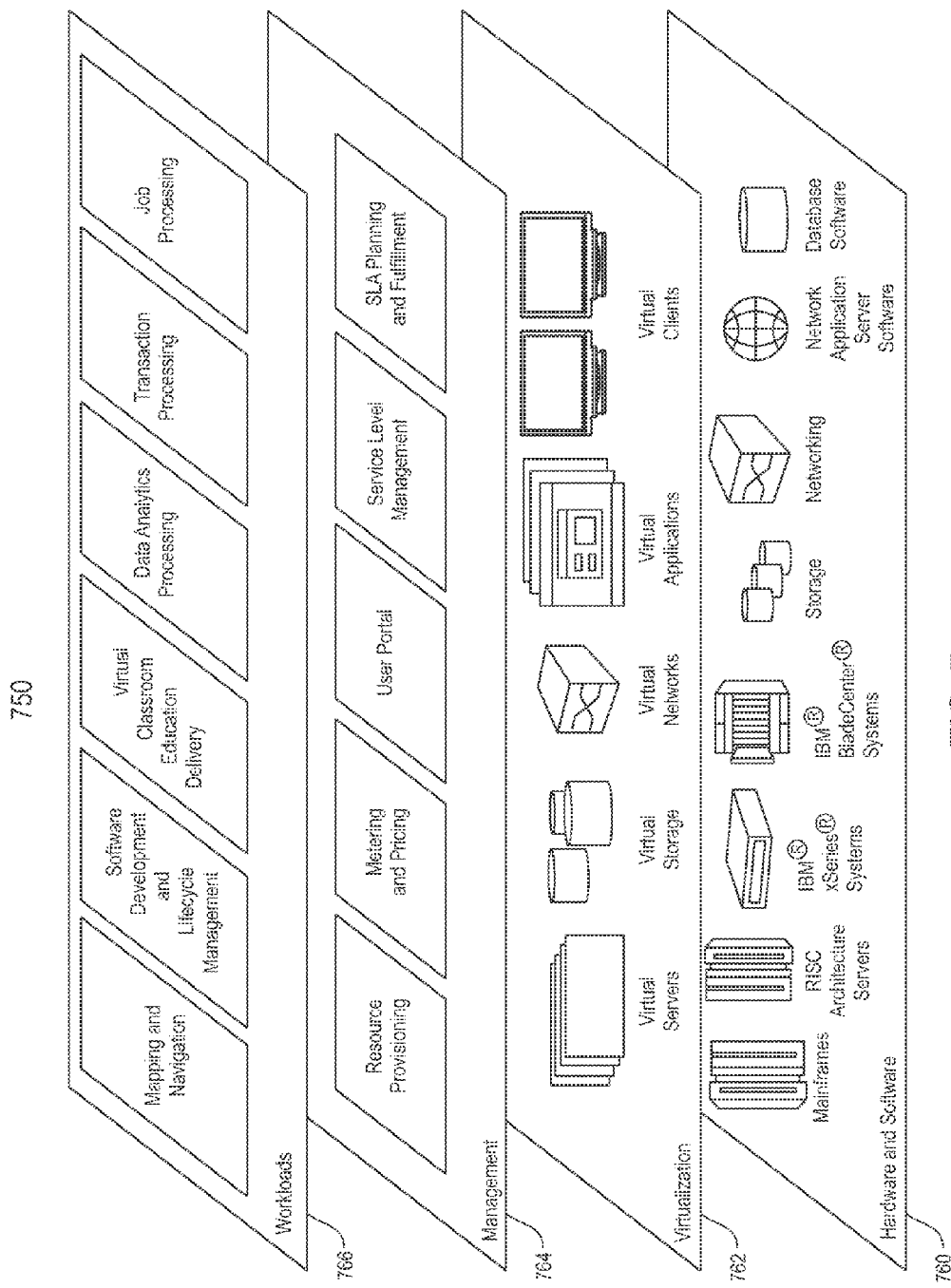
FIG. 7 depicts abstraction model layers according to an embodiment of the present invention.

Referring now to FIG. 7, a set of functional abstraction layers provided by cloud computing environment (750) is shown. It should be understood in advance that the components, layers, and functions shown in FIG. 1-4 are intended to be illustrative only and embodiments of the invention are not limited thereto. As depicted, the following layers and corresponding functions are provided: hardware and software layer (760), virtualization layer (762), management layer (764), and workload layer (766). The hardware and software layer (760) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (762) provides an abstraction layer from which the following examples of virtual entities may be provided: virtual servers; virtual storage; virtual networks, including virtual private networks; virtual applications and operating systems; and virtual clients.

In one example, management layer (764) may provide the following functions: resource provisioning, metering and pricing, user portal, service level management, and SLA planning and fulfillment. The functions are described below. Resource provisioning provides dynamic procurement of computing resources and other resources that are utilized to perform jobs within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and jobs, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (766) provides examples of functionality for which the cloud computing environment may be utilized. An example of workloads and functions which may be provided from this layer include, but is not limited to: mapping and navigation, software development and lifecycle management, virtual classroom education delivery, data analytics processing, job processing, and processing one or more jobs responsive to sharing characteristics of data blocks together with the structuring of system memory within the cloud computing environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
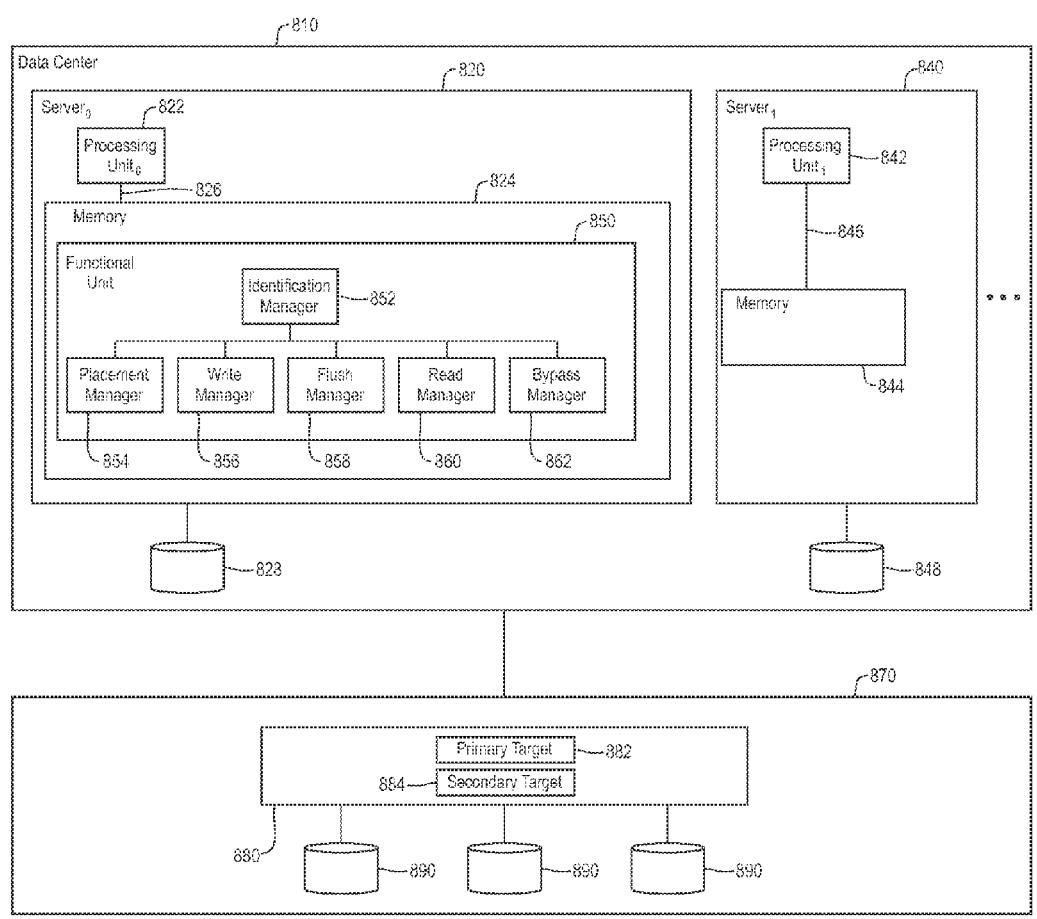
FIG. 8 depicts a block diagram illustrating tools embedded in a computer system to support optimization of a cache storage layer, and read and write transactions responsive to the optimized cache storage layer for use within a shared pool of resources.

As shown in FIGS. 1-4, a method is provided to support data storage cache classification in virtualized environments. More specifically, a multi-level storage system cache is employed together with an adaptive technique to reduce cache pollution and latency By layering the storage system cache, client-side changes are reduced, if not removed. FIG. 8 is a block diagram (800) illustrating tools embedded in a computer system to support the adaptive technique employed for multi-level caching. More specifically, a shared pool of configurable computer resources is shown with a data center (810). Although only one data center is shown in the example herein, the invention should not be limited to this quantity of data centers in the computer system. Accordingly, one or more data centers may be employed for storing data in both cache and persistent storage.

Each of the data centers in the system is provided with at least one server in communication with data storage. More specifically, data center (810) is shown herein with two servers (820) and (840). Server (820) has a processing unit (822), in communication with memory (824) across a bus (826), and in communication with data storage (828); server (840) is provided with a processing unit (842), in communication with memory (844) across a bus (846), and in communication with second local storage (848). Servers (820) and (840) are shown to reside in data center (810). In one embodiment, servers (820) and (840) may reside in separate data center and communicate across a network connection. While two servers are shown (820) and (840) respectively, any number of servers may be employed within a single data center or multiple data centers.

As shown in detail in FIG. 8, storage system (870) is shown in communication with the data center (810). In one embodiment, the storage system (870) may be in communication with a plurality of data centers. The storage system (870) includes a cache layer (880) having classified sections comprising a primary layer (882) and a secondary layer (884) in communication with persistent storage (890).

A functional unit is further provided within any number of servers in one or more data center. For ease of description, server (820) is shown having a functional unit (850) in communication with the processing unit (822) and having tools embodied therewith. The tools include but are not limited to: an identification manager (852), a placement manager (854), a write manager (856), a flush manager (858), a read manager (860), and a bypass manager (862). Accordingly, tools in the form of managers are provided to support read and write transactions with an optimized storage system.

The identification manager (852) differentiates one or more blocks of data based on an inherent sharing characteristic of the data blocks. In one embodiment, the inherent sharing characteristic of the data block is determined based on whether the data block is shared with multiple disk images from multiple virtual machines in the system network. In one embodiment, the number of virtual machines sharing a data block through associated disk images is a determinant for differentiating a sharing characteristic of the data block. In another embodiment, the number of times a data block is accessed is a determinant for differentiating a sharing characteristic of the data block. In a further embodiment, the identification manager identifies the data block to support a read transaction as an unshared data block. The placement manager (854) is in communication with the identification manager (852) and places one or more data blocks into one of the classified sections of the cache layer (880) responsive to the sharing characteristic of the data block(s) as determined by the identification manager (852). Accordingly, data blocks are identified and placed into classified sections of the cache layer (880), including either the primary layer (882) or the secondary layer (884).

The write manager (856), in response to a write transaction for one or more unshared data blocks, writes the data to a data storage location in the storage system (870). In one embodiment, the write manager (856) writes the data to the secondary layer (884) of the cache (880) and/or to persistent storage (890). The flush manager (858) is provided in communication with the identification manager (852). The flush manager (858) flushes data from the secondary cache layer (884) to persistent storage (890). The flush manager (858) further evicts the flushed data from the secondary cache layer (884) in response to the flush. In one embodiment, the flush manager (858) does not evict any data from the primary cache layer (882). Accordingly, unshared data blocks are written to the secondary layer (884) of the cache (880) or directly to the persistent storage (890), and data written to the secondary cache layer (884) is flushed from the secondary cache layer to persistent storage (890).

In one embodiment, a read manager (860) is provided in communication with the identification manager (852). The read manager (860) buffers read data from a read transaction of an unshared data block in the secondary cache layer (884). The read manager (860) further sends data from the secondary cache layer (884) to a requesting virtual machine to support the read transaction in a single transaction. In one embodiment, the read manager (860) supports a read transaction of a shared data block from the primary cache layer (882). A bypass manager (862) is provided in communication with the identification manager (852). The bypass manager (862) bypasses the cache storage layer (880) and directly supports a read transaction from persistent storage (890) in response to the identification manager (852) identifying a data block to support a read transaction of an identified unshared data block. Accordingly, read transactions are supported by both shared and unshared data blocks in respective locations.

The identification manager (852), placement manager (854), write manager (856), flush manager (858), read manager (860), and bypass manager (862) are configured to address data block storage in a multi-cache level system. As identified above, the identification manager (852), placement manager (854), write manager (856), flush manager (858), read manager (860), and bypass manager (8624), are shown residing in memory (824) of the server (820). In one embodiment, the identification manager (852), placement manager (854), write manager (856), flush manager (858), read manager (860), and bypass manager (862) may reside in memory local to one or more of the servers residing in the same or different data centers. Similarly, in one embodiment, the managers (852)-(862) may reside as hardware tools external to memory and may be implemented as a combination of hardware and software, or may reside local to memory of any one of the data centers or client sites in the shared pool of resources. Similarly, in one embodiment, the managers (852)-(862) may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage dynamic file sharing collaboration while mitigating data leakage. Accordingly, the managers may be implemented as software tools, hardware tools, or a combination of software and hardware tools.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

Alternative Embodiment(s)

It will be appreciated that, although specific embodiments of the invention have been described herein for purposes of illustration, various modifications may be made without departing from the spirit and scope of the invention. A read transaction for unshared data may be supported with flexibility to either directly read from persistent storage or place data in the secondary cache, depending on one or more characteristics. Such characteristics include, but are not limited to, size of data request, request pattern (sequential or random) detected by the storage system, hints passed to the storage system by the application, space available in primary/secondary cache, etc. Accordingly, the scope of protection of this invention is limited only by the following claims and their equivalents.

We claim:

1. A method comprising:
in a storage system, optimizing a cache storage layer, including classifying data storage cache into a primary cache section and a secondary cache section;
differentiating blocks of data based on an inherent sharing characteristic of the data block; and
utilizing the optimized cache storage layer responsive to the inherent characteristic of the data block, including placing one or more data blocks into one of the classified sections of the cache storage layer, the placement reflecting sharing of the data blocks among virtual disk images access by virtual machines.

2. The method of claim 1, in response to a write transaction for one or more unshared data blocks, writing the data to a data storage location in the storage system selected from the group consisting of: the secondary cache section and persistent storage.

3. The method of claim 2, further comprising flushing data from the secondary cache section to persistent storage and evicting the flushed data from the secondary cache section responsive to the flushing and without evicting data from the primary cache section.

4. The method of claim 1, further comprising in response to a read transaction of one or more shared data blocks, buffering read data in the secondary cache section and sending data from the secondary cache section to a requesting virtual machine to support the read transaction in a single transaction.

5. The method of claim 1, further comprising in response to a read transaction of one or more shared data blocks, supporting the read transaction from the primary cache section.

6. The method of claim 1, further comprising in response to determining the data block in support of a read transaction is unshared, bypassing the cache storage layer and directly supporting a read transaction from persistent storage.

7. A system comprising:
a storage system including a cache layer and persistent storage, the cache layer divided into a primary cache section and a secondary cache section;
a functional unit in communication with the storage system, the functional unit including one or more tools to optimize read and write transactions with the cache layer, the tools comprising:
an identification manager to differentiate blocks of data based on an inherent sharing characteristic of the data block; and
a placement manager to place one or more data blocks into one of the classified sections of the cache layer, the placement to reflect a sharing characteristic of the data blocks among virtual disk images.

8. The system of claim 7, further comprising a write manager in communication with the identification manager, the write manager to write data for one or more unshared data blocks to a storage location in the storage system selected from the group consisting of: the secondary cache section and persistent storage.

9. The system of claim 8, further comprising a flush manager in communication with the identification manager, the flush manager to flush data from the secondary cache section to persistent storage and to evict the flushed data from the secondary cache section in response to the flush and without eviction of data from the primary cache section.

10. The system of claim 7, further comprising a read manager in communication with the identification manager, the read manager to buffer read data from a read transaction of one or more shared data blocks in the secondary cache section and to send data from the secondary cache section to a requesting virtual machine to support the read transaction in a single transaction.

11. The system of claim 7, further comprising a read manager in communication with the identification manager, the read manager to support a read transaction of one or more shared data blocks from the primary cache section.

12. The system of claim 7, further comprising a bypass manager in communication with the identification manager, the identification manager to identify the data block to support a read transaction as unshared, and the bypass manager to bypass the cache storage layer and directly support the read transaction from persistent storage.

13. A computer program product for optimization of a cache layer, the computer program product comprising a computer readable storage medium having program code embodied therewith, the program code being executable by a processor to:
  optimize a cache storage layer in a storage system, including classifying data storage cache into a primary cache section and a secondary cache section;
  differentiate blocks of data based on an inherent sharing characteristic of the data block; and
  utilize the optimized cache storage layer responsive to the inherent characteristic of the data block, including placing one or more data blocks into one of the classified sections of the cache storage layer, the placement reflecting sharing of the data blocks among virtual disk images access by virtual machines.

14. The computer program product of claim 13, further comprising in response to a write transaction for one or more unshared data blocks, writing the data to a data storage location in the storage system selected from the group consisting of: the secondary cache section and persistent storage.

15. The computer program product of claim 14, further comprising flushing data from the secondary cache section to persistent storage and evicting the flushed data from the secondary cache section responsive to the flushing and without evicting data from the primary cache section.

16. The computer program product of claim 13, further comprising in response to a read transaction of one or more data blocks, buffering read data in the secondary cache section and sending data from the secondary cache section to a requesting virtual machine to support the read transaction in a single transaction.

17. The computer program product of claim 13, further comprising in response to a read transaction of one or more shared data blocks, supporting the read transaction from the primary cache section.

18. The computer program product of claim 13, further comprising in response to determining the data block in support of a read transaction is unshared, bypassing the cache storage layer and directly supporting the read transaction from persistent storage.

* * * * *